United States Patent [19]

Rimmer et al.

[11] Patent Number: 5,276,896
[45] Date of Patent: Jan. 4, 1994

[54] APPARATUS FOR IMPLEMENTING DATA COMMUNICATIONS BETWEEN TERMINAL DEVICES AND USER PROGRAMS

[75] Inventors: Todd M. Rimmer, Frazer; Duane J. McCrory, Malvern; William P. Jordan, Ephrata; Jeffrey E. Dremann, Coatesville, all of Pa.

[73] Assignee: Unisys Corporation, Plymouth Meeting, Pa.

[21] Appl. No.: 535,721

[22] Filed: Jun. 11, 1990

[51] Int. Cl.[5] ............................................. G06F 13/12
[52] U.S. Cl. .................................... 395/800; 395/250; 395/275; 364/DIG. 1; 364/134; 364/132; 364/228; 364/228.1; 364/241.9; 364/241
[58] Field of Search ............. 395/860, 700, 275, 325, 395/600, 800, 250; 364/134, 132

[56] References Cited

U.S. PATENT DOCUMENTS

| | | | |
|---|---|---|---|
| 4,293,924 | 10/1981 | Struger et al. | 364/900 |
| 4,642,760 | 2/1987 | Yanai et al. | 364/200 |
| 4,665,501 | 5/1987 | Soldin et al. | 364/900 |
| 4,688,170 | 8/1987 | Waite et al. | 364/200 |
| 4,734,853 | 3/1988 | Nakano | 364/200 |
| 4,742,447 | 5/1988 | Duvall et al. | 395/375 |
| 4,742,450 | 5/1988 | Duvall et al. | 395/700 |
| 4,788,657 | 11/1988 | Douglas et al. | 364/900 |
| 4,809,217 | 2/1989 | Floro et al. | 364/900 |
| 4,809,217 | 2/1989 | Floro et al. | 364/900 |
| 4,811,216 | 3/1989 | Bishop et al. | 395/425 |
| 4,885,677 | 12/1989 | Heilman et al. | 364/184 |
| 4,885,739 | 12/1989 | Read et al. | 370/58.1 |
| 4,888,691 | 12/1989 | George et al. | 395/700 |
| 4,918,589 | 4/1990 | Floro et al. | 395/275 |
| 4,965,717 | 10/1990 | Cutts, Jr. et al. | 364/200 |
| 4,972,368 | 11/1990 | O'Brien et al. | 364/900 |
| 5,053,945 | 10/1991 | Whisler | 364/200 |
| 5,086,504 | 2/1992 | Nemeth-Johannes et al. | 395/200 |

FOREIGN PATENT DOCUMENTS 59-181853 10/1982 Japan .
59-16045 1/1984 Japan .

OTHER PUBLICATIONS

Wakerly, John F. "Microprocessor input/output Architecture", Microprocessors & Microcomputers—Selected Reprints from Computer, pp. 42-49 (1977).
"The Mid, A New Concept in Computer Building Blocks," Moreley and Green Proceeding of the Seventh Texas Conference on Computing Systems, Oct. 31, 1978, pp. 9-14.
"A Terminal Handler as an Example of an Intelligent Peripheral Controller," T. W. Starnes, Electro. vol. 6, Apr. 1981, pp. 1-8.

(List continued on next page.)

*Primary Examiner*—Robert B. Harrell
*Assistant Examiner*—Mehmet Geckil
*Attorney, Agent, or Firm*—Ratner & Prestia

[57] ABSTRACT

Apparatus for implementing input/output (I/O) operations in a computer system operating under the control of a UNIX* operating system includes a dedicated communications processor in addition to the main or host processor. These two processors communicate via a shared memory which may be independently accessed by each processor. The functions performed by the terminal I/O driver and the line discipline modules are divided between the host and communications processors. The communications processor performs all canonical processing of the data received from the terminal I/O devices. It also maintains a data structure that indicates the instantaneous status of each terminal I/O device. Using this data structure, the communications processor is able to operate in a substantially interrupt-free environment, polling only those I/O devices that are indicated, in the status data structure, as needing service. A message facility in the shared memory controls communication between the processors. Each processor sends messages to the other through a dedicated circular queue. To receive a message, a processor examines the sending queue of the other processor. Response messages are sent back to the sending processor using the same message buffer as was used for the original message.

*UNIX is a trademark of AT&T

14 Claims, 13 Drawing Sheets
Microfiche Appendix Included
(248 Microfiche, 3 Pages)

OTHER PUBLICATIONS

"A Multiprocessor Minicomputer Designed for Unixl" Myers and Munsey, Computer Design, vol. 21, No. 2, Feb. 1982, pp. 87-96.

"Optimizing Xenix I/O," Bottorff and Potts, Computer Design, vol. 22, No. 9, Aug. 1983, pp. 175-184.

Unix Internals, Myril Clement Shaw and Susan Soltis Shaw Copyright 1987, pp. 131-140, 147-151.

The "Session Tty" Manager S. M. Bellovin, Summer Usenix '88, pp. 339-354.

The Streams Machine, David Simpson, Mini-Micro Systems, Feb. 1989, pp. 62-64, 66, 68, 71.

Interrupts Aren't Always Best George Pajari, BYTE, May 1989, pp. 261-264.

"A Stream Input-Output System", D. M. Ritchie, AT&T Bell Laboratories Technical Journal vol. 63, No. 8, Oct. 1984.

HOST SOFTWARE OPEN SYSTEM CALL

HOST SOFTWARE READ SYSTEM CALL

HOST SOFTWARE WRITE SYSTEM CALL

IOCTL SYSTEM CALL

HOST SOFTWARE ISR LEVEL
SIGNAL MESSAGE PROCESSING

HOST SOFTWARE CLOSE SYSTEM CALL

COMMUNICATIONS PROCESSOR MAIN POLL LOOP

APPARATUS FOR IMPLEMENTING DATA COMMUNICATIONS BETWEEN TERMINAL DEVICES AND USER PROGRAMS

A microfiche Appendix is included in this application containing 3 microfiche. Microfiche Number 1 contains 97 frames plus one test target frame for a total of 98 frames. Microfiche Number 2 contains 97 frames plus one test target frame for a total of 98 frames. Microfiche Number 3 contains 51 frames plus one test target frame for a total of 52 frames.

A portion of this patent document contains material which is subject to copyright protection. The owner has no objection to the facsimile reproduction by anyone of the patent document or patent disclosure as it appears in the Patent and Trademark Office patent file or records, but otherwise reserves all rights whatsoever.

FIELD OF THE INVENTION

The present invention concerns an interface for coupling remote terminals to a host computer and in particular to an interface which is especially useful for UNIX ™ based computer systems.

BACKGROUND OF THE INVENTION

In a computer system operating under control of the UNIX operating system, user terminal devices provide the principle interface to human operators. In order to make this interface as responsive as possible, input and output (I/O) operations to these user terminal devices are handled with special techniques. These techniques are generally described below. A more detailed description is contained in a book by M. C. Shaw et al. entitled *UNIX Internals A Systems Operation Handbook*, Tab Books, Blue Ridge Summit, Pa., at pages 131-145, which pages are hereby incorporated by reference.

In normal operation, the UNIX operating system maintains three character lists (clists) for each user terminal device. One of these clists, the output clist, contains data which is to be sent to the terminal device for display. A second clist, the raw input clist, contains the data, in raw form, provided by the user terminal This data is in the form of keystrokes. If, for example, a first character were typed and then replaced by a second character through the use of the backspace key, the raw data would contain indications that the first key was pressed, followed by the backspace key and then the second key.

The third clist, the canonical data clist, contains data from the user terminal that has been canonically processed. Canonical processing converts the keystroke data into character data. In so doing, it fixes the data to incorporate the effects of editing keystrokes such as backspace, line feed and delete-line.

In responding to requests to send data to or receive data from a user terminal, the host processor in a typical UNIX based computer system processes the data one character at a time. The host processor is interrupted as each keystroke is made at the user terminal, it then loads the keystrokes into the raw clist. When a carriage return keystroke has been received or when a sufficient number of keystrokes have accumulated, the host processor reads out the keystrokes, one at a time, to perform the canonical processing.

I/O operations from the user terminals are thus handled with a priority that is relatively high in comparison to other tasks running on the host processor. These operations are handled in this manner to ensure that the user perceives an acceptable level of responsiveness from the computer.

This "hands on" approach to managing user terminal devices may result in a relatively large portion of the processing resources of the computer being monopolized by these terminal I/O operations. Monopolization of this type may occur, for example, when a number of user terminals request the display of a relatively large amount of data, while users at other terminals are simultaneously inputting relatively large amounts of data into their terminals.

One solution to this problem has been to couple so-called "intelligent" terminal processors to the host system. These processors collect keystrokes in an internal buffer, and pass the buffer to the host processor when an certain event has occurred. These events may include, for example, a carriage return keystroke, a pause between keystrokes that is greater than a preset maximum, or the collection of a predetermined number of keystrokes. Whenever one of these events occurs, the terminal processor transfers the collected block of characters to the raw clist in the host processor. The host processor then canonically processes the keystrokes to produce the character data for the canonical data clist.

Thus, although the host processor has been relieved of the burden of handling character-by-character interrupts from the user terminals, it still performs the canonical processing on the keystrokes and implements any control functions needed to operate the terminals. In addition, the host still responds to interrupts generated by the "intelligent" terminal processors which indicate, for example, that data is ready for transfer to the host. Even this reduced level of interaction between the host and the remote user terminals may produce a significant reduction in the apparent performance of the entire computer system.

Furthermore, even in this configuration, many UNIX based computer systems are unable to handle terminal devices which are periodically polled to effect data transfer. These terminals do not generate interrupts to control data transfer. This type of terminal may be handled by a UNIX based computer having terminal I/O functions that are modified to allow polling of the remote devices. Alternatively, hardware may be added between the terminal and the host to periodically poll the terminals and simulate interrupts to the host processor at the appropriate times.

SUMMARY OF THE INVENTION

The present invention is embodied in a computer system operating under control of a UNIX-like operating system. This computer system includes a communications processor in addition to the host processor for performing I/O operations to user terminal devices. The communications processor is coupled to a group of memory storage cells that is shared with the host processor. The terminal I/O functions are divided between the communications processor and the host such that the communications processor handles the interrupts from the terminals and converts character stream data provided by a terminal into data held in a data buffer. The host processor periodically examines the data buffer to take data provided by the terminals, from the data buffer, as it becomes available.

According to another aspect of the invention, an embodiment of a message passing facility is implemented between the host and communications processors. This embodiment includes a circular queue into which message data is placed by the host processor. This message data represents task requests from the host processor to the communications processor. This queue is periodically examined by the communications processor which removes the message data and performs the requested tasks. In normal operation, no interrupts between the host and communications processors are used by this message passing facility.

According to yet another aspect of the invention, the computer system includes event logic which maintains status data, for a plurality of the terminal devices. This status data is used by the communications processor to determine the order in which terminal devices are serviced. This status data significantly improves the performance of the communications processor by eliminating unnecessary device polling.

DETAILED DESCRIPTION OF THE PREFERRED EMBODIMENT OF THE INVENTION

Overview

Figure 1:
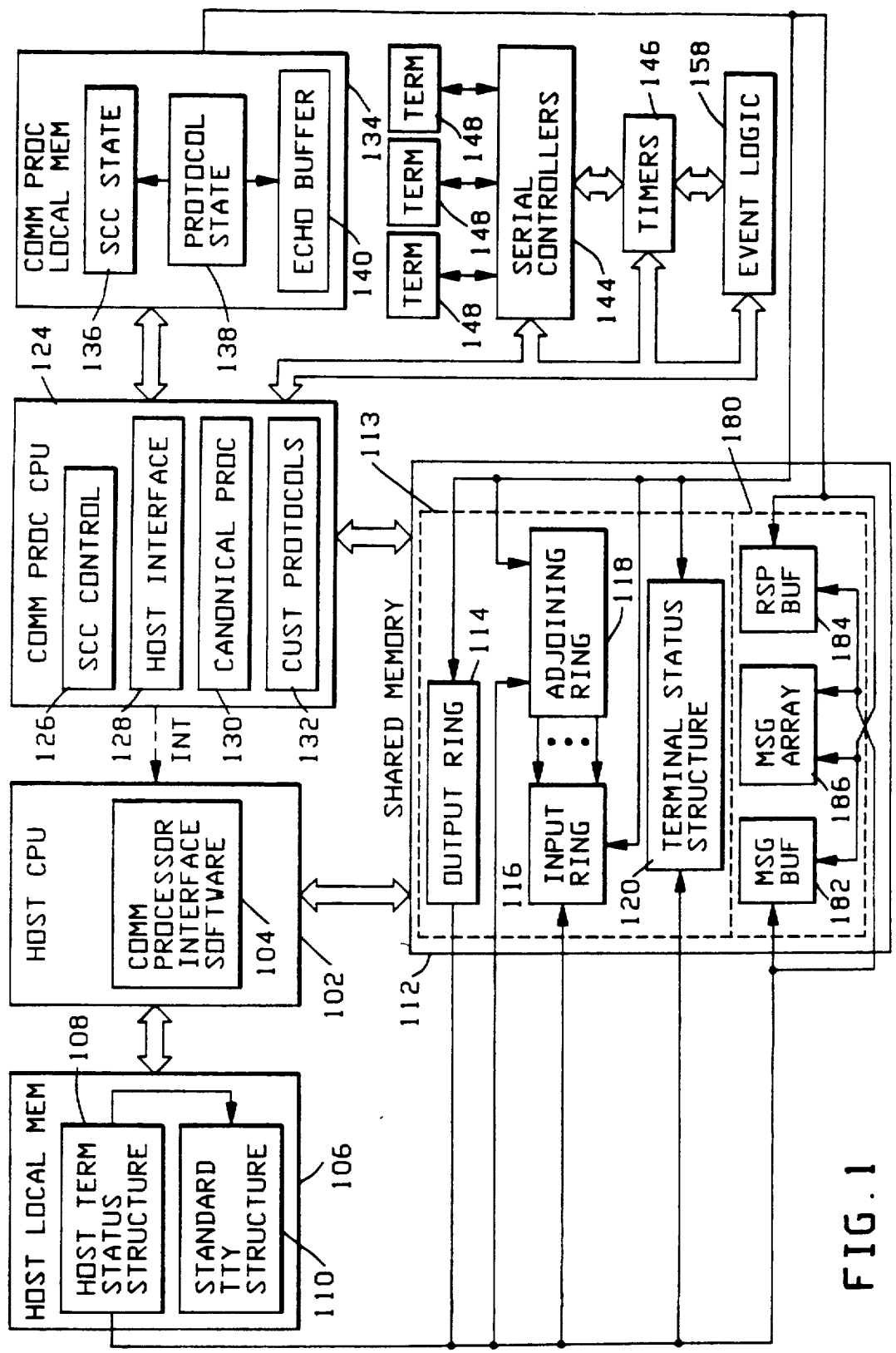
FIG. 1 is a block diagram of a UNIX-based computer system which includes an embodiment of the present invention.

The central elements of the computer system shown in FIG. 1 are the host processor 102, the shared memory 112, the communications processor 124, the serial controllers 144 and the remote terminals 148. In operation, the host processor 102, operating under control of user programs requires data from, and generates data for transmission to the remote terminals 148.

This data is transferred via a pair of ring buffers, an output ring buffer 114 and an input ring buffer 116, which are held in a set of data structures 113 for use by a specific terminal. There is a unique set of data structures 113 for each terminal device 148 that has been made available (i.e. "OPENed") on the computer system.

Data to be sent to a terminal 148 is placed into the output ring buffer 114 by the host processor 102. In this embodiment of the invention, the output ring buffer 114 is periodically monitored by the communications processor 124 to determine if data is available for display on one of the terminals 148. When the communications processor finds an output ring buffer 114 that is not empty, it reads the data from the buffer 114 and passes it to the appropriate terminal 148 through the corresponding serial controller 144.

When data is available at one of the remote terminals, it is transferred, by the communications processor 124, from the terminal 148 via the serial controller 144. This data is stored, one character at a time, in the input ring buffer 116. In addition to storing the data in the ring buffer 116, the communications processor 124 may store information, in an adjoining buffer 118, regarding logical separations of the input data. This information would normally be stored as a result of receiving a specific character (e.g. a carriage return or a line feed), alternatively, it may indicate that a fixed number of characters has been received or that a preset amount of time has elapsed since the last character was received. When a program running on the host processor 102 requests a certain logical data block (e.g. a typed line), the host processor checks the adjoining ring 118 to determine the bounds of the requested data and then transfers data from the input ring buffer 116 to memory locations in the host local memory 106. These memory locations are accessible to the requesting program.

The combination of the output ring buffer 114, input ring buffer 116 and adjoining buffer 118 in the shared memory 112 form an interrupt-free data passing facility between the host processor 102 and the communications processor 124 for each terminal 148 that is connected to the system. In this embodiment of the invention, this data passing facility has been extended to a more general utility for passing messages between the host processor 102 and the communications processor 124. While this message passing facility is disclosed in this specific application, it has general applicability for transferring messages between any two independent processors or between two independent processes running on a common processor.

In the exemplary embodiment, a message ring buffer 182 is used by the host processor 102 to send messages to the communications processor 124. The communications processor, in turn, uses a response ring buffer 184 to send messages to the host processor 102. Both processors may access the message array 186. In this exemplary embodiment of the invention, there is only one message ring buffer 182, one response ring buffer 184 and one message array 186 in the shared memory 112.

The function of the messages transferred through this mechanism is to convey requests or to indicate events that are not directly associated with data transfer to or from the terminal 148. For example, the host processor 102, upon finding an input ring 116 empty, would post a WAIT DATA message to the communications processor 124 through the message ring buffer 182. In response to this message, the communications processor 124 send the WAIT DATA message to the host processor 102 when the requested number of characters have been placed into the corresponding input ring 116.

This message passing scheme is the key to achieving low overhead on the host processor 102 for terminal input and output operations. Using this scheme, the host processor first polls the response ring buffer 184 to determine which events have occurred and then transfers any data that may correspond to the returned message from the input ring buffer 116.

As an alternative to allowing the host processor 102 to operate without being interrupted by the communications processor, the system can be configured with an optional interrupt line INT (shown in phantom in FIG. 1). In an exemplary implementation, the host processor 102 may be interrupted by the communications processor 124 at regular intervals which are long in comparison to the time for an I/O operation to complete. These interrupts would only be provided when messages are pending in the response ring buffer 164.

As set forth above, the host processor 102 may operate without being interrupted by the communications processor 124. In addition, the communications processor 124 may operate without being interrupted by the serial controllers 144. In this embodiment of the invention, the communications processor 124 includes special event logic 158 which allows the communications processor 124 to poll the serial controllers in order to service more serial controllers at higher data rates than would otherwise be possible on the same communications processor in an interrupt driven environment.

Detailed Description

The following is a detailed description of an exemplary embodiment of the present invention with reference to FIGS. 1-9. Further details on this exemplary embodiment may be found in a document entitled "Software Design for PC-host/Pc-COMM Interface" which is included as an appendix to this specification.

In FIG. 1, the host CPU 102 and the host local memory 106 constitute a computer which is operating under control of a UNIX or UNIX-like operating system. In a typical computer system controlled by a UNIX operating system, all of the processing associated with initiating, terminating and controlling input and output (I/O) operations to remote terminals is handled by the host processor.

In the present embodiment of the invention, however, the host processor 102 is only concerned with sending or receiving blocks of data. The processing steps associated with initiating, controlling and terminating operations on the actual remote terminal devices are handled by the communications processor 124 and its associated memory 134.

The host CPU 102 and host local memory 106 used in this embodiment of the invention may be any of a number of IBM compatible personal computers, based on either the 80286, 80386 or 80486 microprocessors manufactured by Intel corp. As shown in FIG. 1, the software which controls the host CPU 102 includes communications processor interface software 104. This software is in addition to the UNIX operating system and provides an interface between the communications processor and the operating system. Two terminal I/O data structures are illustrated in FIG. 1 as being maintained in the host local memory 108. The host terminal status structure contains message passing information and various host state and synchronization flags. The host processor 102 also maintains the standard UNIX tty structure, 110, in the host local memory 106.

In this embodiment of the invention, the shared memory 112 is implemented as an array of dual-ported random access memory (RAM) integrated circuits such as the TMS4256FML circuits manufactured by Texas Instruments Corp. The contents of these RAM's may be read and written at each of the two ports using independent clock signals. As set forth above, the input ring buffer 114, output ring buffer 116, adjoining ring buffer 118 and terminal status structure are maintained in shared memory 112. There is a set of these structures for each terminal 148 that is available to the system. In addition, there is one set of message passing structures 180 for passing task requests and events between the host processor 102 and the communications processor 124.

The exemplary communications processor is an 80C186 microprocessor also manufactured by Intel Corp. The communications processor local memory may include conventional RAM integrated circuits. The exemplary serial controllers 144 are Z85C30 integrated circuits manufactured by Zilog Inc. and the exemplary timer circuits 146 are 82C54 integrated circuits manufactured by Intel Corp. The programs which run on the communications processor are illustrated in FIG. 1.

The Serial Communication Controller (SCC) program 126 generates the commands for the serial controllers 144. The host interface 128 coordinates the communications processor 124 with the host processor 102 through the shared memory 112. Using the canonical processing algorithms 130, the communications processor 124 performs UNIX canonical processing on the keystrokes received from, and sent to the terminal devices 148. Finally, any custom protocols which may be desired to aid communication with particular types of terminals are implemented by algorithms 132 programmed to be executed on the communications processor 124. The canonical processing algorithms 130 and the custom protocols 132 are communications procedures. As set forth below, these procedures interact directly with the serial controllers 144 and the ring buffers 114, 116 and 118 to effect data transfer between the terminals 148 and the shared memory 112.

The serial controllers 144 provide the data transfer interface between the communications processor 124 and the remote terminal devices 148. The timers 146 and the event logic 158 are used by the canonical processing procedures 130 and the custom protocol procedures 132 to coordinate the timing and movement of data between the ring buffers 114, 116 and 118 in shared memory 112, and the serial controllers 144.

In an interrupt driven system, the controllers 144 and timer circuits 146 would interrupt the communications processor 124 to provide status information from the terminal devices, status information may be available, for example, when a keystroke had been made or when a character had been displayed. When status information is to be obtained for a relatively large number of terminals, the accompanying interrupts may represent a significant performance burden. If the communications processor is operated using a polling scheme, however, there may be significant overhead involved in polling each of the serial controllers 144 for the status of each of the attached terminal devices. It may be more efficient, therefore, if the status data for all of the terminal devices is maintained in a structure which is directly accessible to the communications processor 124 so that multiple polling operations may be performed in parallel.

To this end, the processing system shown in FIG. 1 includes event logic 158 which monitors the status of each of the terminals 148 via the serial controllers 144 and the timer circuitry 146. The status information collected by the event logic 158 is processed by the communications processor 124 and is used to invoke protocol specific routines within the communications procedures 130 and 132.

Figure 1A:
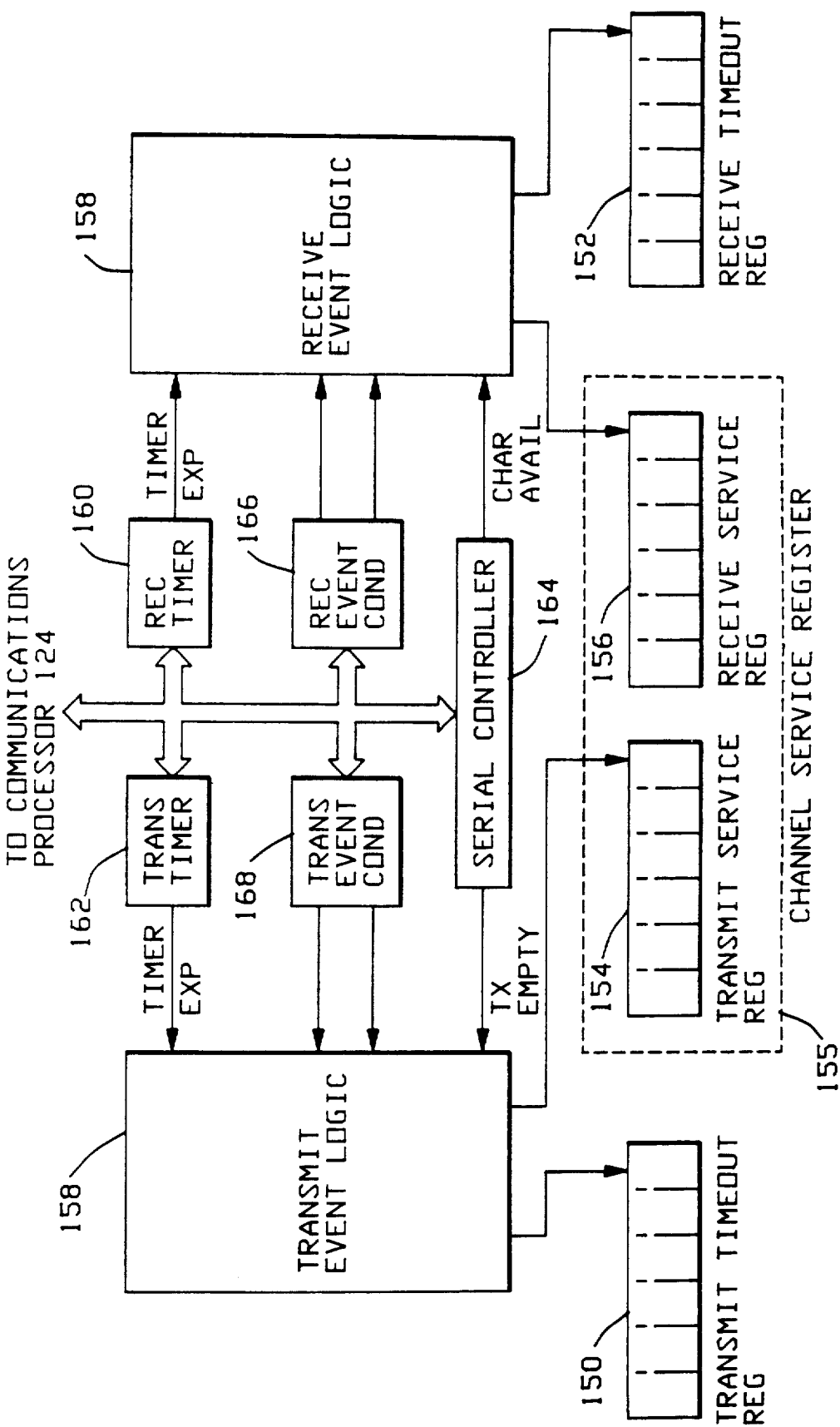
FIGS. 1a and 1b are block diagrams showing details of the event logic suitable for use with the communications processor shown in FIG. 1.
Figure 1B:
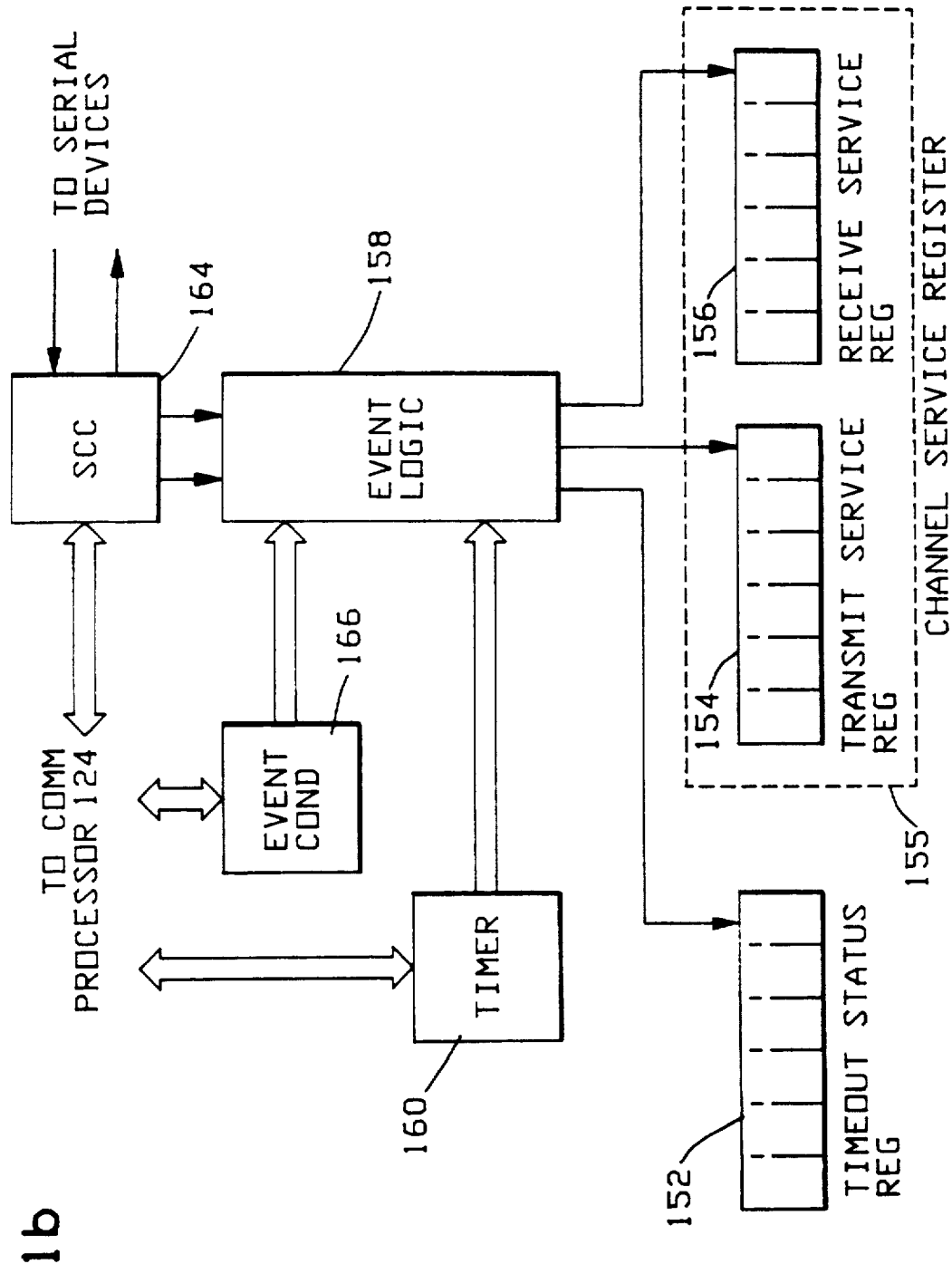

FIGS. 1a and 1b are block diagrams of exemplary circuitry which illustrates how the event logic circuitry 158 is configured with the controllers 144 and timers 146.

FIG. 1a illustrates a configuration in which separate read and write timers are maintained for each serial channel. In FIG. 1a, circuitry for a single serial channel is shown. The SCC 164 is one of the serial controllers 144 and the timers 160 and 162 are two of the timers 146 shown in FIG. 1. The event logic 158 is coupled to the controller 164, to transmit and receive event conditioners 166 and 168 and to the timers 160 and 162 to convert transmit and receive service requests provided by the controller 164 and set timer and timer elapsed events provided by the timer circuits 160 and 162 into status bits for the channel.

As shown in FIG. 1a, the status bits for the channel are maintained in four status registers, 150, 152, 154 and 156 which are located in the communications processor local memory 134. In this embodiment of the invention, these registers hold status bits for six channels. Each of these channels may serve multiple terminals. For each change in status of the registers 154 and 156, the communications processor 124 determines which of the channels has been affected and invokes a routine from one of the communications procedures 130 and 132 (shown in FIG. 1) for the affected channels.

Typically, separate communications procedure dependent routines are maintained for transmit and receive requests. If, during a prior invocation, the communications procedure had conditioned the event logic to monitor both the serial controller 164 events and the timer events, it would inspect the corresponding bit of the time-out status register 150 or 152 in addition to the service register 154 or 156 The corresponding bit of the time-out status register for the channel indicates whether the serial controller event or the time-out event occurred first.

Corresponding status bits for a channel are held in corresponding bit-positions of each of the registers 150, 152, 154 and 156. A larger number of channels may be accommodated by increasing the number of bit-positions in each of the registers.

In normal operation, the communications processor 124 periodically polls a channel service register (CSR) 155, which includes the transmit service register 154 and the receive service register 156. When a bit is found to be set in the CSR 155, a communications procedure for the channel is invoked. The setting of the bits in the CSR 155 indicate which events of the serial controller 164 and/or timer circuitry 160 and 162 have occurred. The value in the CSR 155 also determines which routines of the communications procedures 130 and 132 are invoked.

For the purpose of this discussion two events, TX EMPTY and CHARACTER AVAILABLE from the serial controller 164 and one event, time-out from the timers 160 and 162 will be considered. The TRANSMIT (TX) EMPTY event indicates that the channel is ready to send another character to one of the terminal devices 148 while the CHARACTER AVAILABLE EVENT indicates that the channel is holding a character provided by one of the terminal devices 148. The time-out event indicates that the time set by the communications procedure 130 or 132 has elapsed. The receive timer 160 provides a receive time-out event and the transmit timer 162 provides a transmit time-out event.

Typically, different routines in the communications procedures are invoked for transmit service requests than are invoked for receive service requests. The invoked routine would inspect the time-out registers 150 and 152 only if it had conditioned the event logic 158 to monitor both serial controller events and timer events simultaneously. In this instance, the value held in the timer registers 150 and 152 would indicate whether the serial controller event or the time-out event had occurred first.

The transmit event conditioner 168, shown in FIG. 1a, may be set in one of four ways by the communications processor 124. For the first setting, the timer expired event, from the transmit timer 162, appears as a set bit in the transmit time-out register 150 and the TX EMPTY event from the serial controller 164 appears as a set bit in the transmit service register 154. The second setting of the event conditioner 168 causes the timer expired event to appear in both the transmit time-out register 150 and the transmit service register 154. Using this setting, the TX EMPTY event of the serial controller 164 is ignored. For the third setting, the timer expired event appears only in the transmit time-out register 150; the corresponding bit in the transmit service register 154 is always reset. When the fourth setting is used, the logical OR of the timer expired event and the TX EMPTY event appears in the transmit service register 154. The corresponding bit in the transmit time-out register 150 is only set if the timer expired event of the transmit timer 162 occurs before the TX EMPTY event of the serial controller 164.

The receive event conditioners 166, shown in FIG. 1a, may also be set in four ways. These settings cause the receive event logic to operate in the same manner as set forth above with reference to the transmit event conditioners 168, except that the receive timer 160 is used instead of the transmit timer 162 and the CHARACTER AVAILABLE event of the serial controller 164 is used instead of the TX EMPTY event.

FIG. 1b shows an alternative implementation of the event logic in which only one timer, 160, is used for both receive and transmit requests and only one register 152 is used to indicate channel time-out status. The operation of the event logic in FIG. 1b is slightly different from that of FIG. 1a. The event conditioner 166 of FIG. 1b may be set in one of at least four ways. Using the first setting, the timer expired event appears in the time-out status register 152, the TX EMPTY event appears in the terminal service register 154 and the CHARACTER AVAILABLE event appears in the receive service register 156. The second setting causes the CHARACTER AVAILABLE event to appear in the receive service register 156, the logical OR of the TX EMPTY event and the timer expired event to appear in the transmit service register 154. The corresponding bit in the time-out register 152 is set only if the timer expires before the TX EMPTY event occurs. For the third setting, the TX EMPTY event appears in the transmit service register 154 and the logical OR of the timer expired event and the CHARACTER AVAILABLE event appears in the receive service register 156. The corresponding bit in the time-out register 152 is set only if the timer expires before the CHARACTER AVAILABLE event occurs. The fourth setting ignores the TX EMPTY and CHARACTER AVAILABLE events. In this mode, the timer expired event appears in the time-out status register 152 and in the appropriate one of the transmit service register 154 or receive service register 156. The corresponding bit in the other service register is held reset.

Figure 2A:
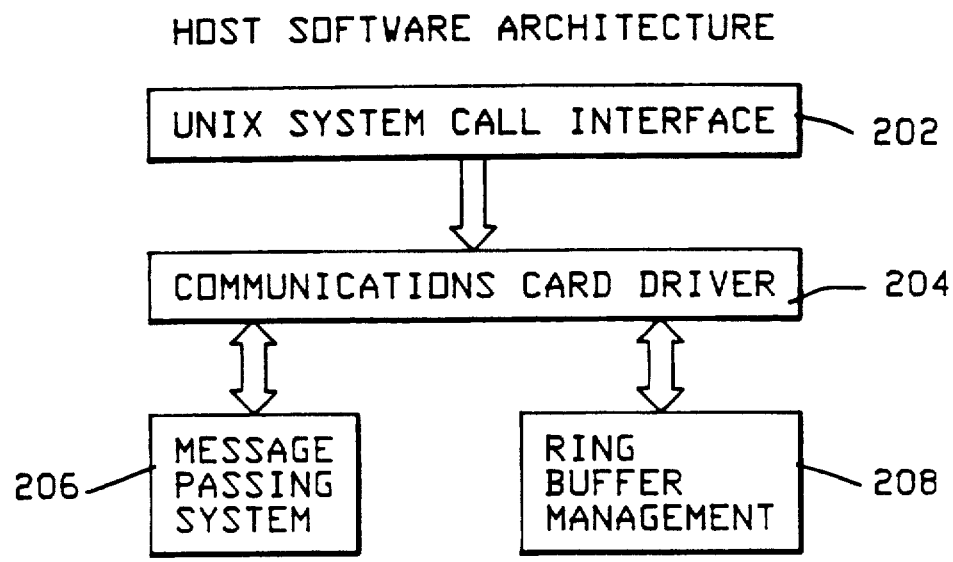
FIG. 2a is a block diagram which illustrates the apparent architecture of the programmed host processor in the computer system shown in FIG. 1.
Figure 2B:
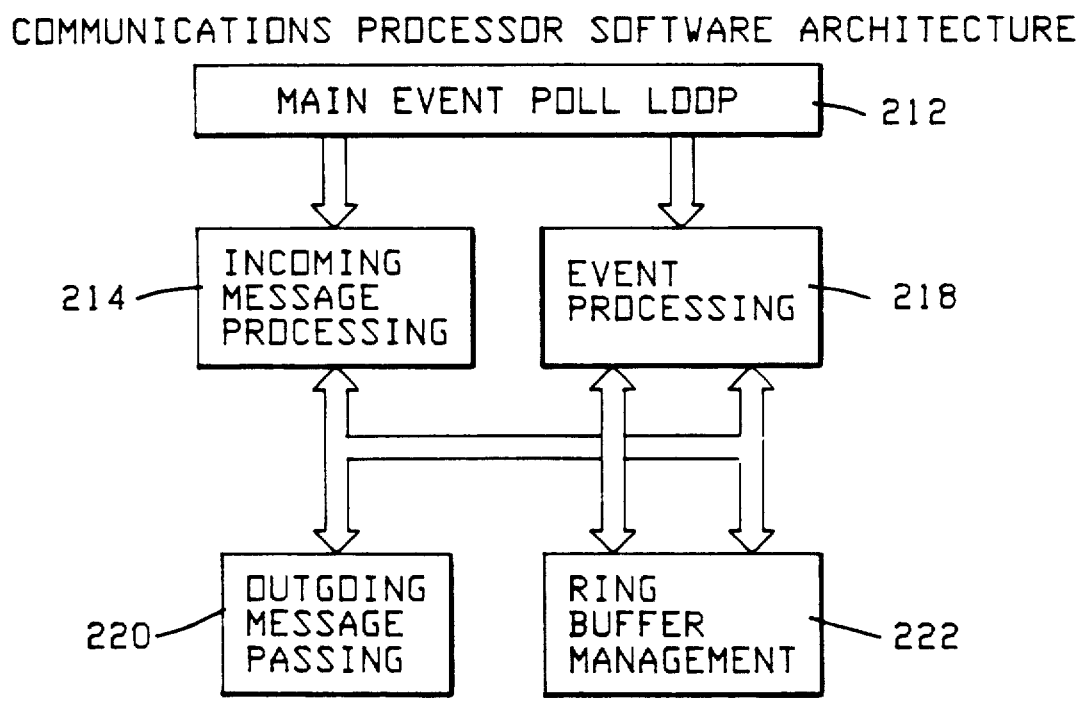
FIG. 2b is a block diagram which illustrates the apparent architecture of the programmed communications processor shown in FIG. 1.

FIGS. 2a and 2b provide an overview of the structure of the system software for the respective host processor 102 and communications processor 124. This software, which is described in more detail in reference to FIGS. 3 through 9 is for use with the hardware shown in FIGS. 1, 1a and 1b.

In FIG. 2a, the UNIX system call interface 202 is a standard part of the UNIX operating system. The remaining blocks in FIGS. 2a and 2b are not found in a standard UNIX system. These blocks are invoked in place of the terminal device drivers and line discipline modules that would be used by a standard UNIX system to communicate with one or more terminal devices.

The system shown in FIGS. 2a and 2b operates as follows. A user program running under control of the UNIX operating system issues an I/O request to a terminal device through the UNIX system call interface. This request may be to open or close the device as a user program file, to perform a read or write operation or to issue a control command which changes functional characteristics of the device.

In response to these requests, the system call interface 202 invokes procedures within the communications card driver module 204. These procedures, in turn, may invoke ring buffer management routines 208 for the terminal 148 and they may invoke the message passing system 206.

As shown in FIG. 2b, the communications processor 124 of FIG. 1 continually executes a main event poll loop 212. This loop periodically checks the status of the various terminal devices available to the system, using the event logic 158, and checks for incoming messages from the host processor 102. The result of processing an incoming message 214 or of executing one of the event processing procedures 218 (i.e. the routines of the communications procedures 130 and 132) may be an invocation of outgoing message passing procedures 220 to send messages back to the host processor 102. The message processing procedures 214 and the event processing procedures 218 may also invoke ring buffer management procedures 222 which manage the ring buffer data structures for the various terminals 148.

Figure 2C:
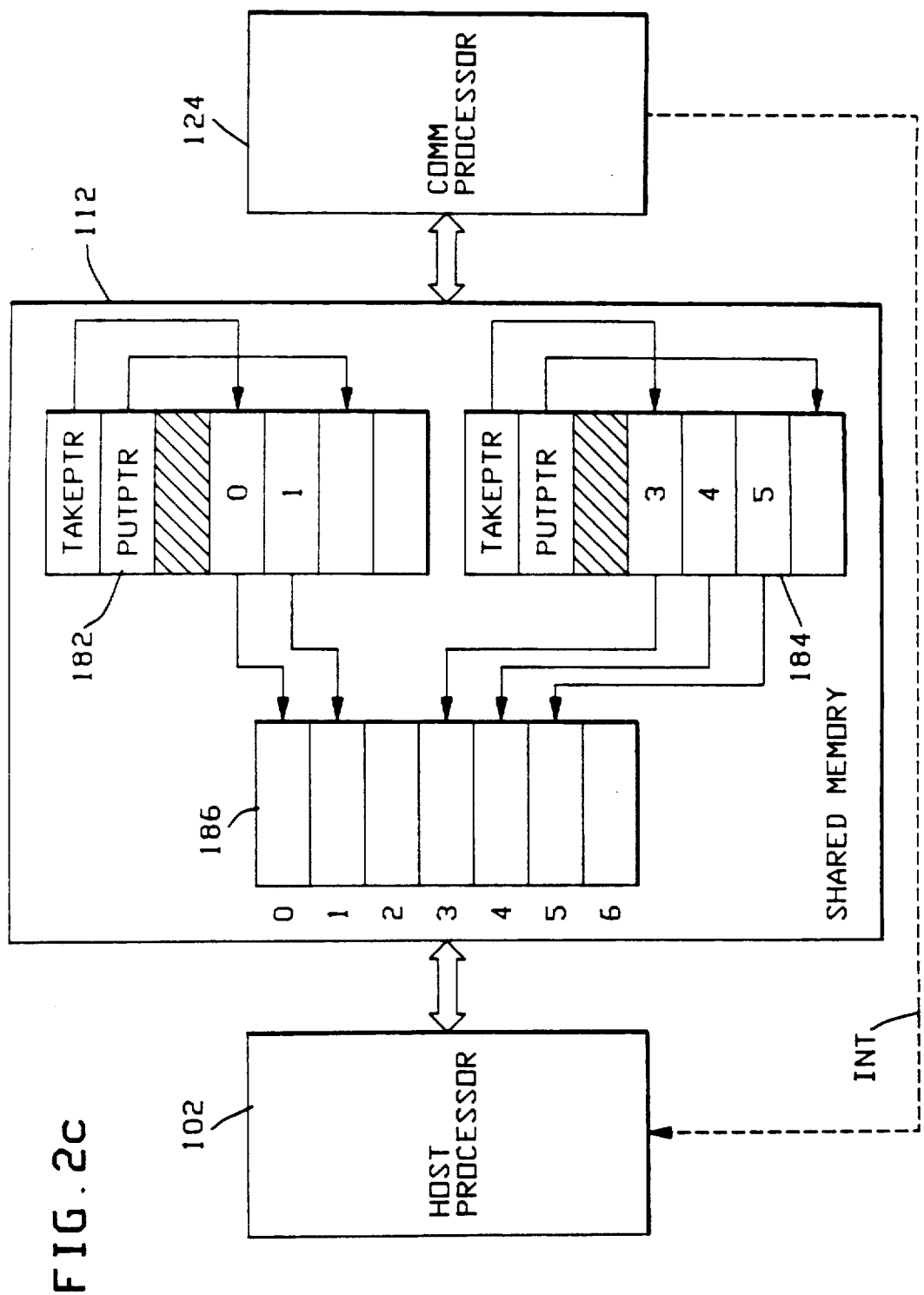
FIG. 2c is a block diagram which is useful for describing the operation of a message passing facility used in the computer system shown in FIG. 1.

FIG. 2c is a block diagram which is useful for explaining the operation of the message passing facility. Messages passed between the host processor 102 and the communications processor 124 are stored in a message array 186 which is a part of the message passing structures and messages data structure 180, shown in FIG. 1. The message array 186 is organized as N fixed-length messages. In this embodiment of the invention, a portion of these messages are assigned to the host processor 102 and the remainder are assigned to the communications processor 124.

The common memory 112 includes two data structures which are used by the processors 102 and 124 to coordinate message transfer. These are the message ring buffer 182 and the response ring buffer 184. Each of these ring buffers includes a number M of slots which can point to messages in the message array 186. In addition, each buffer includes two indexing variables TAKEPTR and PUTPTR. The TAKEPTR variable points to the slot in the buffer for the next message to be taken by the processor that reads messages transferred through the buffer and the PUTPTR variable points to the next slot to be used by the processor that writes messages which are transferred through the buffer.

For normal message transfer, each processor writes the index of the message into the outgoing message ring buffer at the location in the ring buffer addressed by the value PUTPTR and then increments PUTPTR. The other processor detects that incoming messages are available when the PUTPTR value of its incoming ring is not equal to the TAKEPTR value. The index of the message in the message area 186 is retrieved by reading the slot in the ring buffer that is addressed by TAKEPTR. The value TAKEPTR is then incremented to point to the next index value in the ring buffer. The receiving processor then examines the message in the message array 186 and performs the requested action. Usually, the action includes the step of returning the message as a response back to the originating processor using its outgoing message ring buffer.

In the present embodiment of the invention, messages are passed from the communications processor to the host processor 102 through the response buffer 184. Thus, the PUTPTR variable of the response buffer 184 holds a pointer to the next response buffer slot into which a message index will be written when the communications processor 124 generates a message for the host processor 102. The TAKEPTR variable of the response buffer 184 points to the slot in the response buffer 184 which points to the next message index to be read by the host processor 102. The entries PUTPTR and TAKEPTR of the message buffer 182 operate identically except that the roles of the host processor 102 and communications processor 124 are reversed.

In this embodiment of the invention when one of the processors 102 or 124 reads a message it holds onto the message entry until any response indicated by the received message is ready to be sent back. The receiving processor then fills the entry with the information for the response and sends the entry to the original sending processor. When this message is received by the sending processor, the message entry is marked as empty and is added to a queue of available messages. Alternatively, if only a small number of message types may be sent, the sending processor may allocate different message entries to respectively different ones of the message types.

The message passing facility described above has more general application than is shown in FIGS. 1–9. It may be used between any two processors that have a shared memory structure or between any two processes running on a single processor as long as the processes may access a common memory area.

The output ring buffer 114 and input ring buffer 116 are an example of an application of this message passing facility. These buffers provide simple, efficient message transfer between the host processor 102 and the communications processor 124. In this instance, the messages being transferred are individual characters either received from, or to be transmitted to the terminals 148. In this application of the message passing facility, no analog to the message buffer 186 is needed since the data to be transferred may be stored directly into the slots of the ring buffers.

This application of the message passing facility includes a message passing structure, the adjoining ring buffer 118 that has no analog in the message passing structures 180. The values in the ring 118 are keyed to the data in the input ring buffer 116. Each of the entries in the adjoining ring buffer 118 contains an input buffer slot number which indicates a logical separation of the data in the input ring buffer 116. In this embodiment of the invention, for example, these pointers indicate the ends of lines, for data being canonically processed, and indicate the character at which a character limit or time limit was reached for data being transferred in raw mode. For canonically processed data, the information in the adjoining ring buffer 118 is used by the host processor to identify specific characters (e.g. carriage return). Thus it is unnecessary for the host processor 102 to scan the data in each message for the presence of these characters.

Figure 3:
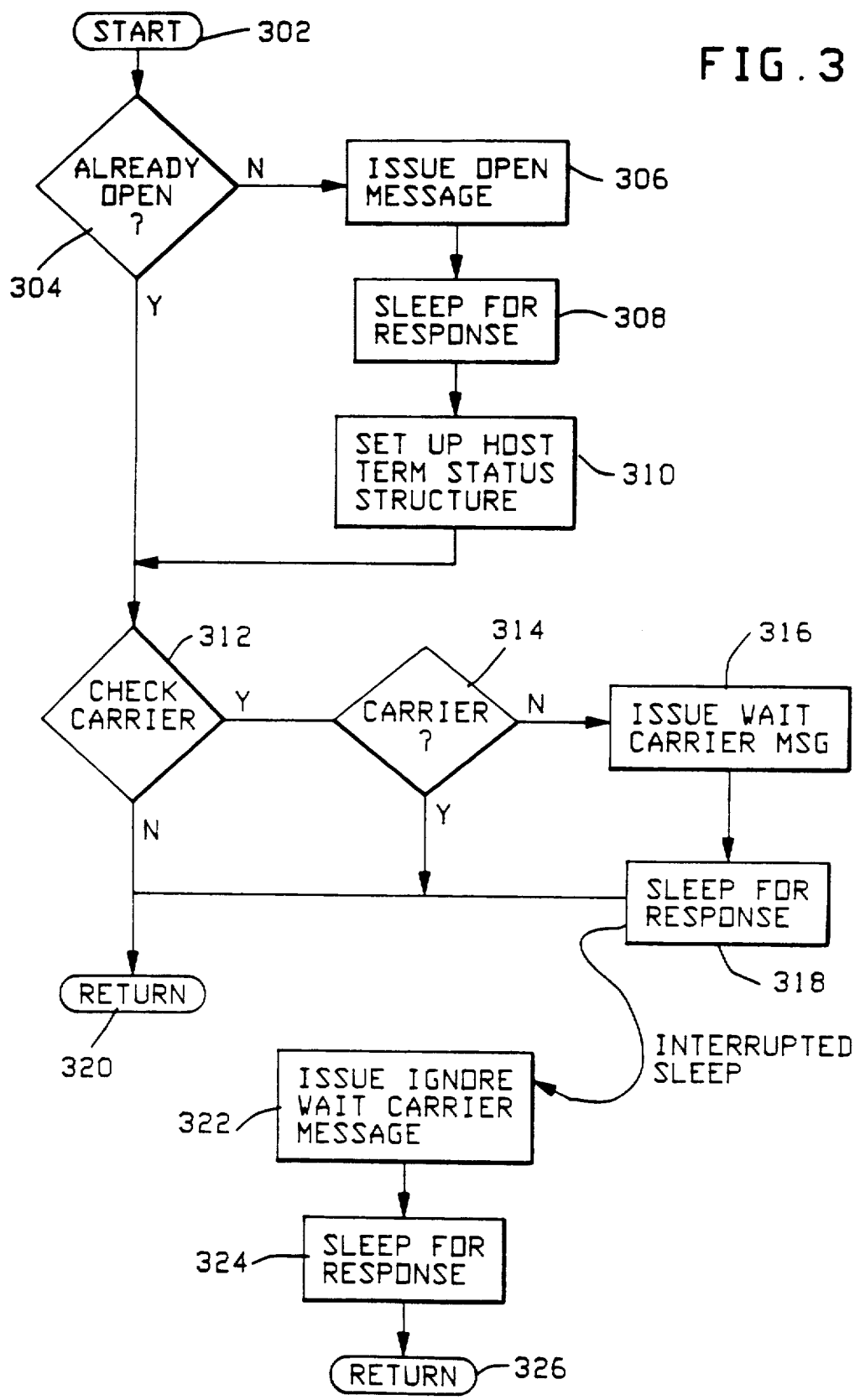
FIG. 3 is a flow-chart diagram of a host software open system call which is useful for explaining the operation of a host processor shown in FIG. 1.

FIGS. 3 through 8 are flow-chart diagrams which illustrate the operations performed on the host processor 102, shown in FIG. 1, for various types of I/O operations. FIG. 3 illustrates the operation of opening a remote terminal file. This operation is initiated when an open request is received by the UNIX system call interface 202 from a user program. This initiation corresponds to step 302 of FIG. 3. At step 304, the host processor 102 checks the host terminal status structure 108 in the local memory area 106 to determine if the requested terminal file is already open. If not, at step 306, the host processor 102 issues an message to the communications processor 124 requesting that the terminal file be opened. At step 308, the host processor puts the open system call process to sleep to wait for a response to the open request. While this process is asleep, the host processor 102 may execute other processes.

In response to the open request, the communications processor 124 generates a new set of entries in the terminal status structure 120 for the newly opened terminal, allocates new ring buffers 114, 116 and 118 for the new terminal, initializes the serial controller (SCC) for the channel to which the terminal is coupled (if this channel is not already active) and returns the original open message for the host processor 102 to indicate that the terminal file has been opened.

When the open message from the communications processor 124 is received by the host processor 102 at step 310, the host processor awakens the open system call process at step 310 and initializes the host terminal status entries in the host terminal status structure 108 for the newly opened terminal file.

At step 312, the host processor 102 determines if it should check for the presence of a carrier, that is, whether it should check that the terminal is on-line. This test is based on a flag set in the open system call made through the UNIX system call interface 202. For some types of terminal devices, for example, a modem, the initiation of a carrier is controlled by the program running on the host processor 102. If, at step 312 it is determined that the open system call process should not establish the carrier then the process completes at step 320 and control is returned to the user program that made the request.

If, however, at step 312 it is determined that the open system call should establish the carrier, control is transferred to step 314 where the host processor 102 consults the terminal status structure 120 in the shared memory 112 to determine if the carrier is present for the terminal. If so, the process branches to step 320 and terminates. If not, the process branches to step 316, issues a wait carrier message to the communications processor 124 and, at step 318 is put to sleep to wait for a response.

The normal response to this message would be for the communications processor 124 to condition the appropriate SCC 144 to determine if the carrier is present and, when the carrier has been established, send the wait carrier message back to the host processor 102. It may occur, however, that the carrier is never established for the terminal due, for example, to a hardware fault. In this instance, the system operator may wish to terminate the task. A termination of this type would cause the sleeping open system call process to be awakened with a signal from the UNIX operating system requesting process termination. In response to this signal, the process, at step 322, issues an ignore wait carrier message to clear the entry from the communications processor 124, waits, at step 324, for a response indicating that the entry has been cleared, and returns control to the user program at step 326.

Figure 4:
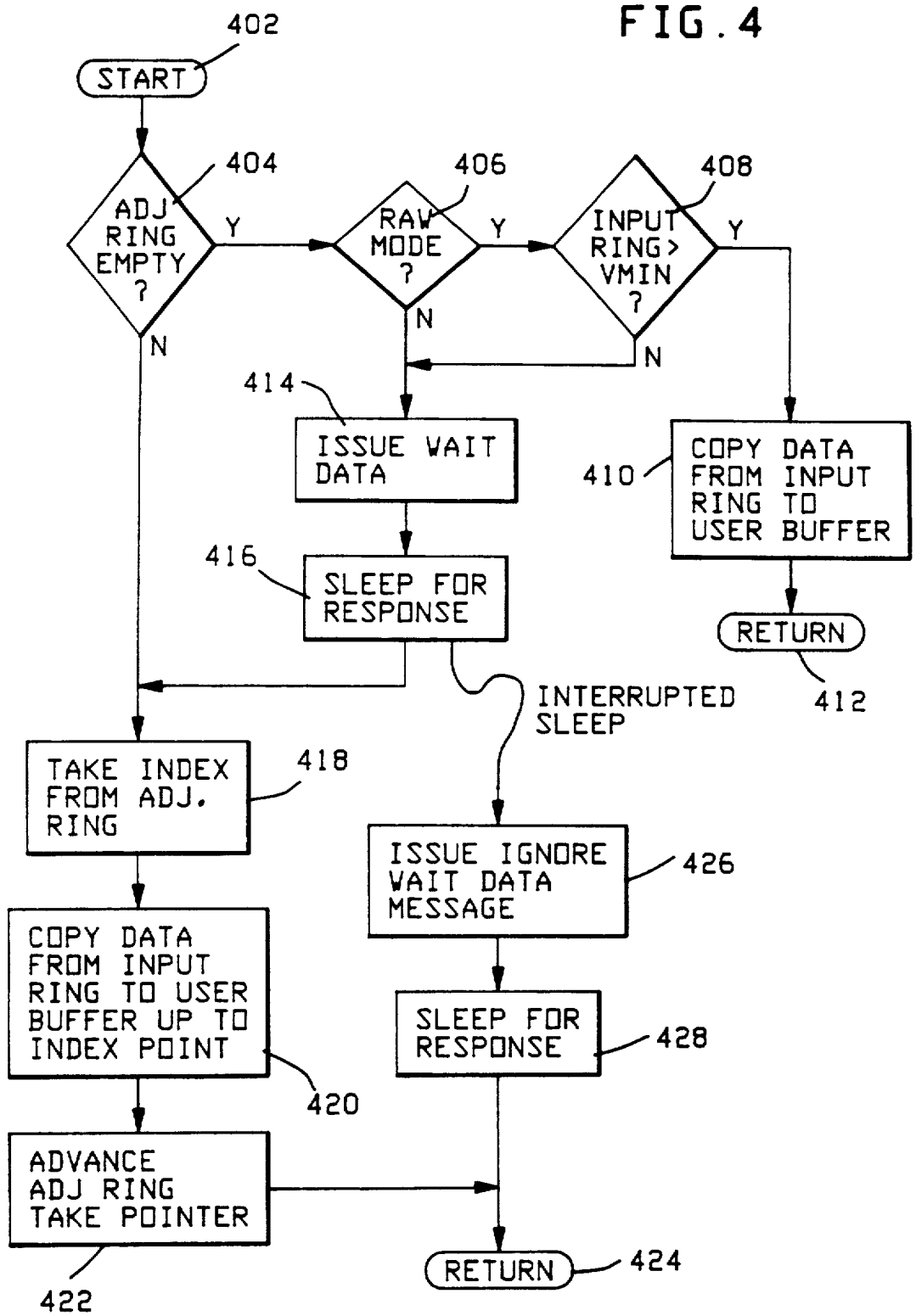
FIG. 4 is a flow-chart diagram of a host software read system call which is useful for explaining the operation of the host processor shown in FIG. 1.

FIG. 4 is a flow-chart diagram which illustrates the steps performed by the host processor 102 in response to a read system call provided via the UNIX system call interface 202, shown in FIG. 2a. In FIG. 4, the read system call is received from the system call interface 202 at step 402. The first step, 404, determines if there is an entry in the adjoining ring buffer 118. If there are adjoining ring entries, data is transferred, at steps 418 and 420 from the slot indicated by the variable TAKEPTR of the input ring buffer 116 up to the slot addressed by the entry in the adjoining ring buffer 118. At step 422, the variable TAKEPTR of the adjoining ring buffer 118 is advanced and the variable TAKEPTR of the input ring buffer 116 is set to the address value originally retrieved from the adjoining ring buffer 118. Next, at step 424, the read operation is complete and control is returned to the user program.

If, at step 404, the adjoining ring is empty, then the read system call process invokes step 406 to determine if the terminal device is operating in raw mode. This information is contained in the tty status structure 110 of the host local memory 106 shown in FIG. 1. If the terminal is not operating in raw mode, the process, at step 414 issues a wait data message to the communications processor 124 and, at step 416, is put to sleep to wait for a response.

If and when data which causes an entry to be made in the adjoining ring buffer 118 is provided by the terminal 148, the read system call process is awakened and control is transferred to step 418, described above. If, while the process is asleep waiting for data, the user program that originated the process is terminated, the sleeping process may be interrupted with a termination signal as indicated. In this instance, the read system call process running on the host processor 102 issues an ignore wait data message to the communications processor 124, at step 426, waits for a response at step 428 and returns control to the user program at step 424.

If, at step 406 it is determined that the terminal is being operated in raw mode, then step 408 is executed to determine if the number of characters in the input ring buffer is greater than VMIN, the minimum number of characters that are transferred for a raw-mode terminal read operation. If so, the data in the input ring buffer 116 is copied to the user buffer, the variable TAKEPTR is incremented by the number of characters removed from the input ring buffer and control is returned to the user at step 412. If, at step 408, the number of characters in the message is less than VMIN, control is transferred to step 414, described above.

Figure 5:
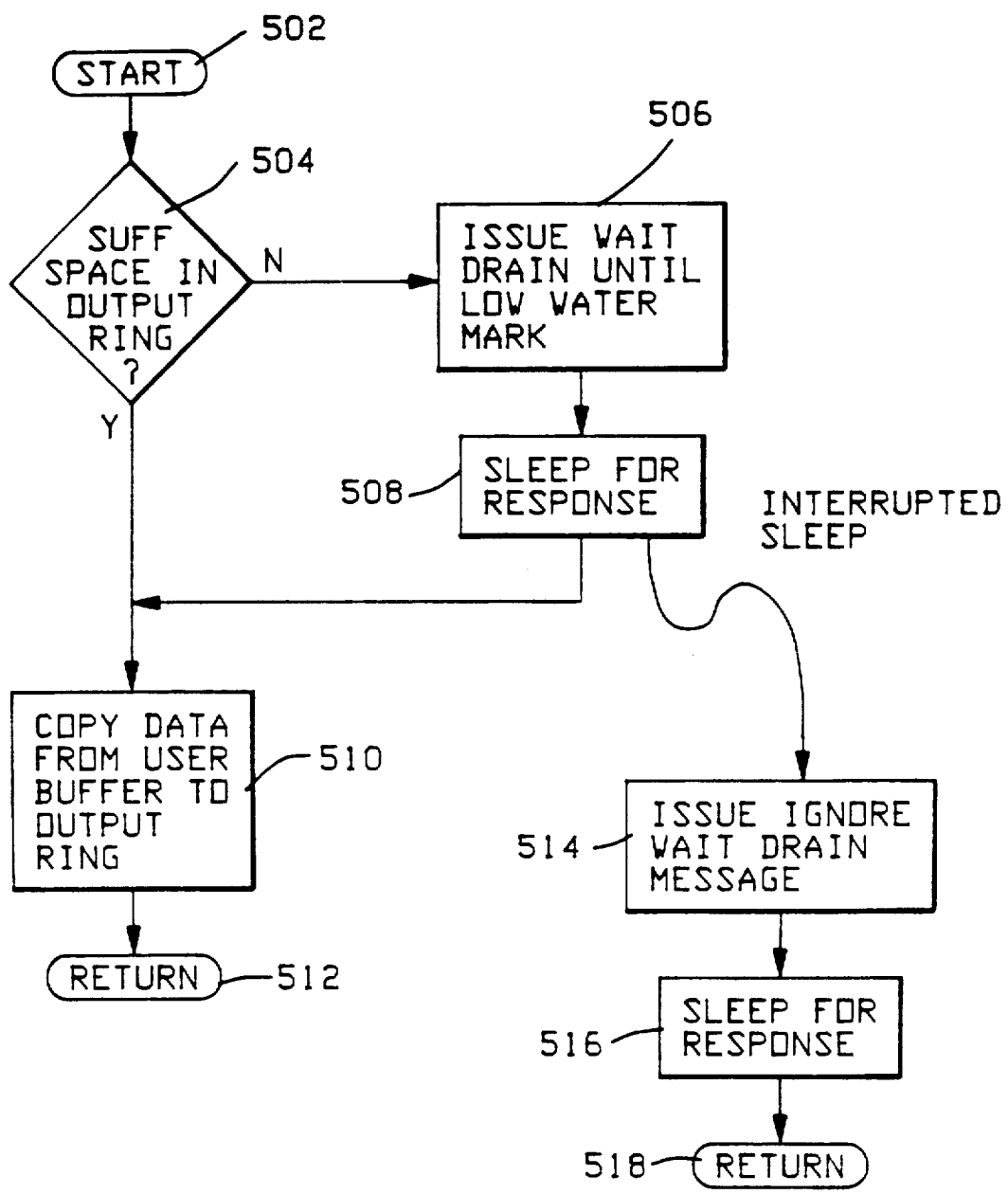
FIG. 5 is a flow-chart diagram of a host software write system call which is useful for explaining the operation of the host processor shown in FIG. 1.

FIG. 5 illustrates the steps performed by the host processor 102 in response to a write system call requested via the UNIX host system call interface 202, shown in FIG. 2a. When the request is received, at step 502, the processor 102 determines, at step 504, if there is sufficient available space in the output ring buffer 114 for the data to be written. If so, data is copied from the user buffer to the output ring buffer starting with the slot addressed by the variable PUTPTR of the output ring buffer. When the data has been loaded into the ring buffer 114, PUTPTR is incremented to point to the next available slot. Following step 510, control is returned to the user program at step 512.

If, at step 504, insufficient space is found in the output ring buffer 114, then, at step 506, the write system call process issues a wait drain message to the communications processor 124. At step 508, the process is put to sleep to wait for the response to the wait drain message. When the communications processor has transferred enough data to the terminal so that a predetermined number of slots in the output ring buffer 114 are empty, it returns the wait drain message to the host processor 102. This message conditions the processor to awaken the sleeping write system call process and transfer control to step 510, described above.

Steps 514, 516 and 518 illustrate the processing performed by the host processor 102 when the sleeping write system call process is awakened by a signal from the UNIX operating system. This signal may indicate, for example, that the user process has been terminated. The processing performed by the communications processor 124 in response to the wait drain message is described below in reference to FIG. 9.

Figure 6:
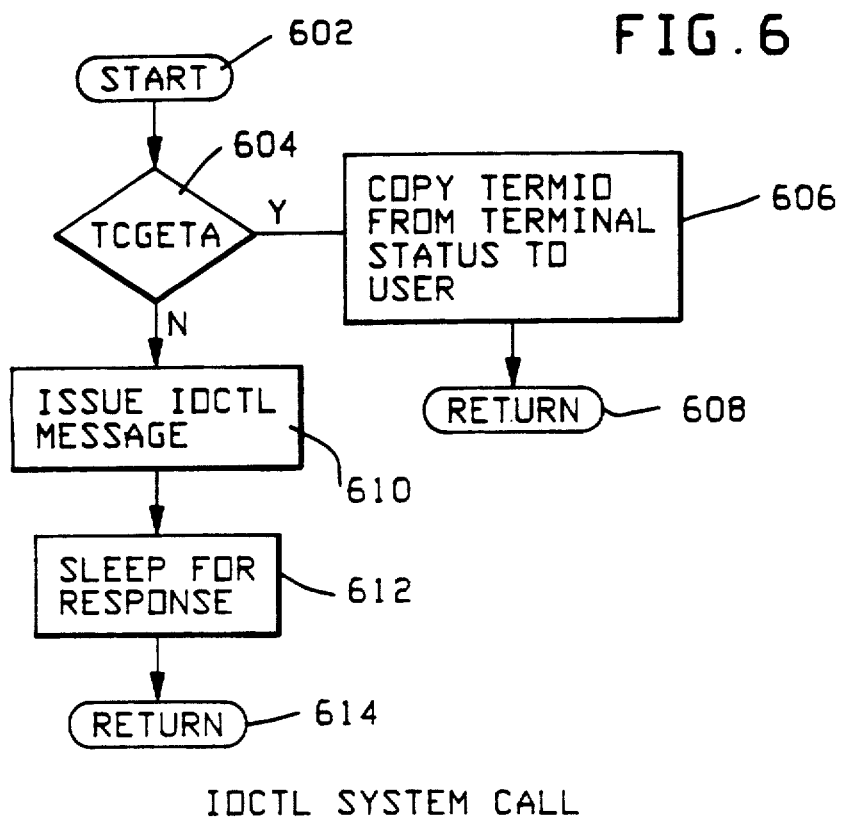
FIG. 6 is a flow-chart diagram of an I/O control (IOCTL) system call which is useful for explaining the operation of the host processor shown in FIG. 1.

FIG. 6 illustrates the steps performed by the host processor 102 in response to an I/O control (IOCTL) system call invoked via the UNIX system call interface 202 shown in FIG. 2a. In this embodiment of the invention, an IOCTL system call is used either to determine the status of, change the characteristics of, or perform special functions on an I/O device. Calls which merely interrogate the status of a device are referred to as TCGETA calls and calls which attempt to change the characteristics of a device are referred to as TCSETA calls. Other calls such as TCSBRK, TCXONC and TCFLUSH perform special control functions such as line break, flow control and buffer flushing, respectively.

After an IOCTL system call is received at step 602, step 604 is executed to determine if it is a TCGETA call or a TCSETA call. If it is a TCGETA call, then the host processor 102 copies the relevant status entries from the tty structure 110 in the host local memory 106 to the user buffer area and returns control to the user program.

If, however, the call is a TCSETA call or a special function call, the processor 102 generates an IOCTL message at step 610 and sends it to the communications processor 124. At step 612, the IOCTL system call process is put to sleep to wait for the response from the communications processor. When the response is received, the IOCTL system call process is awakened and, at step 614, control is returned to the user program. In response to an IOCTL message, the communications processor performs the steps necessary to change the status of the terminal or to perform the special function as requested. These steps depend on the type of communications procedure, serial controller and terminal device that are used.

Figure 7:
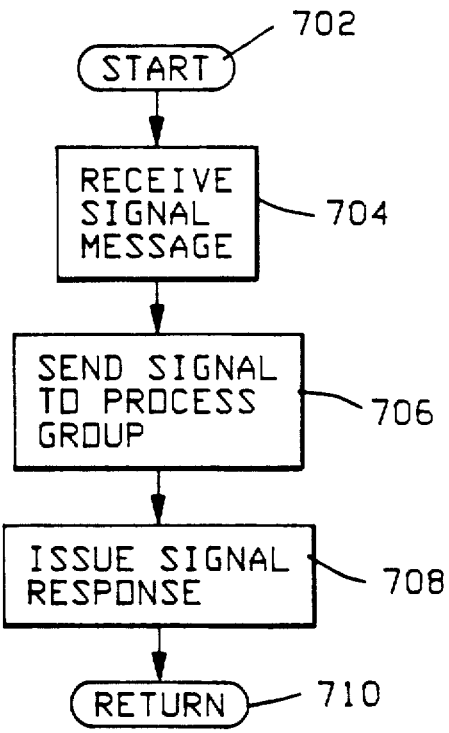
FIG. 7 is a flow-chart diagram of a issue signal response (ISR) level signal message processing which is useful for explaining the operation of the host processor as shown in FIG. 1.

FIG. 7 is a flow-chart diagram which illustrates the steps performed by the host processor 102 in response to an ISR signal message received from the communications processor 124. These messages may be generated, for example, when a kill character or a break character is encountered during canonical processing of keystroke data in the communications processor 124 or when a dropping of the carrier is detected.

In FIG. 7, the signal message is received at step 704 from the communications processor 124. At step 706, the host processor evaluates the message and sends signals to the appropriate process group. These signals awaken the respective process group to indicate the exception. How the signal is handled by each process in the group depends on the particular process. At step 708, the host processor 102 issues the appropriate signal response message to the communications processor 124 to indicate that the signal has been received and to return the message. At step 710, control is returned to the user program.

Figure 8:
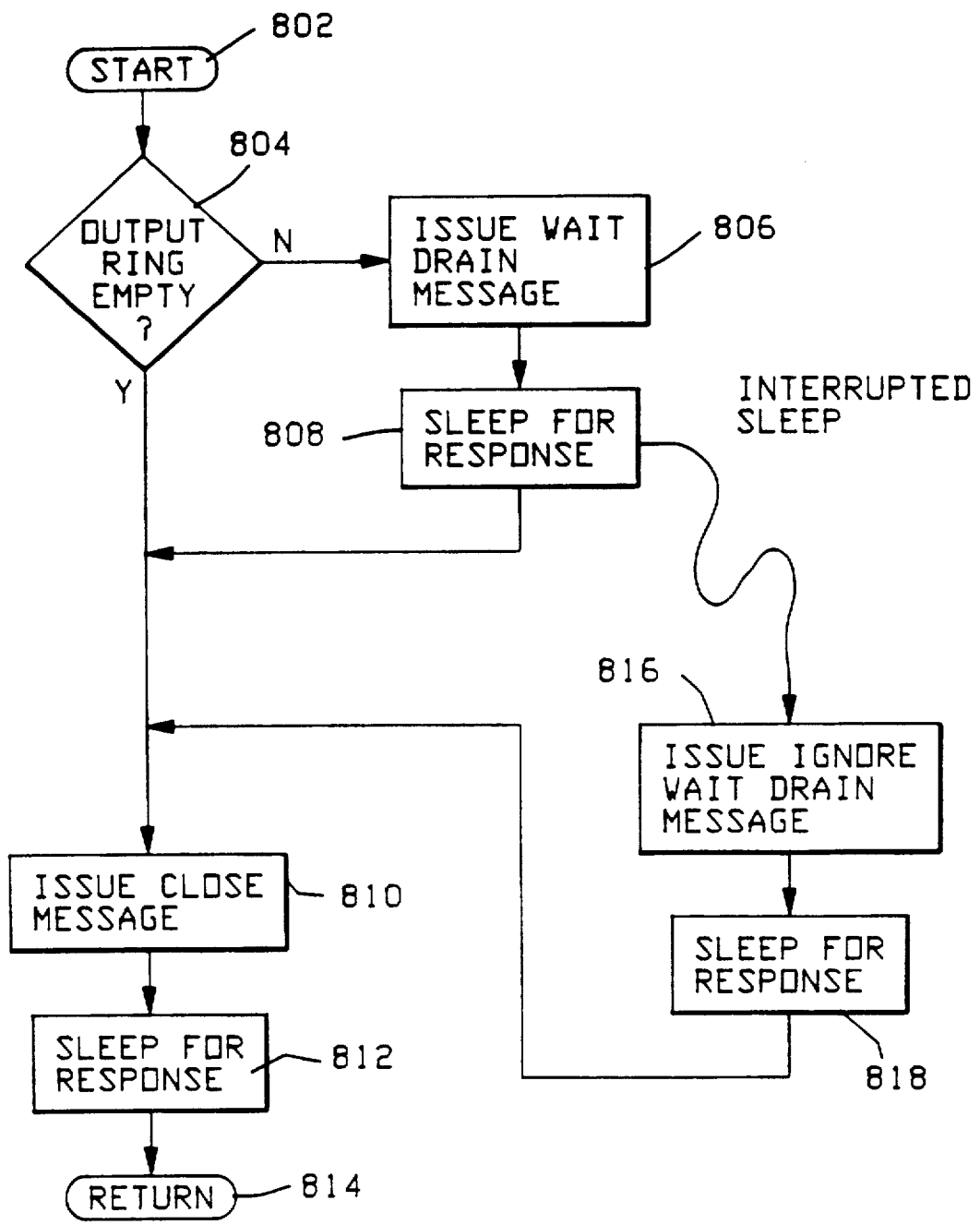
FIG. 8 is a flow-chart diagram of a host software close system call which is useful for explaining the operation of the host processor shown in FIG. 1.

FIG. 8 is a flow-chart diagram of the steps performed by the host processor 102 in response to a close system call from the UNIX system call interface 202 of FIG. 2a. After this system call is received at step 802, the processor 102 checks the output ring buffer 114 to determine if it is empty. If the buffer is empty then there is no more data to be transferred to the terminal. In this instance, the processor 102, at step 810, issues a close message for the terminal to the communications processor 124 and, at step 812, puts the close-system-call process to sleep to wait for the response. When the response is received from the processor 124, the host processor awakens the close-system-call process which returns control to the user process at step 814.

In response to the close message, the communications processor 124 signals the appropriate one of the serial controllers 144 to drop the carrier to the terminal device, deallocates the output ring buffer 114, the input ring buffer 116 and the adjoining ring buffer 118, deallocates t he terminal status structures for the terminal in the shared memory 112 and returns the close message to the host processor 102.

If, at step 804, the output ring buffer is not empty, the host processor 102, at step 806, issues a wait drain message to the communications processor 124 and, at step 808, puts the close system call process to sleep until the processor 124 responds. This wait drain message tells the communications processor 124 to wait until the output ring buffer 114 is empty. When the host processor 102 has received a response from the communications processor 124, it awakens the close system call process and transfers control to step 810, described above.

If the sleeping close system call process at step 808 is awakened by a signal message from the UNIX operating system, the host processor issues an ignore wait drain message at step 816 to clear the outstanding message from the processor 124 and puts the close-system-call process to sleep to wait for the response. When the response is received, the close process is awakened and control is transferred to step 810, described above.

Figure 9:
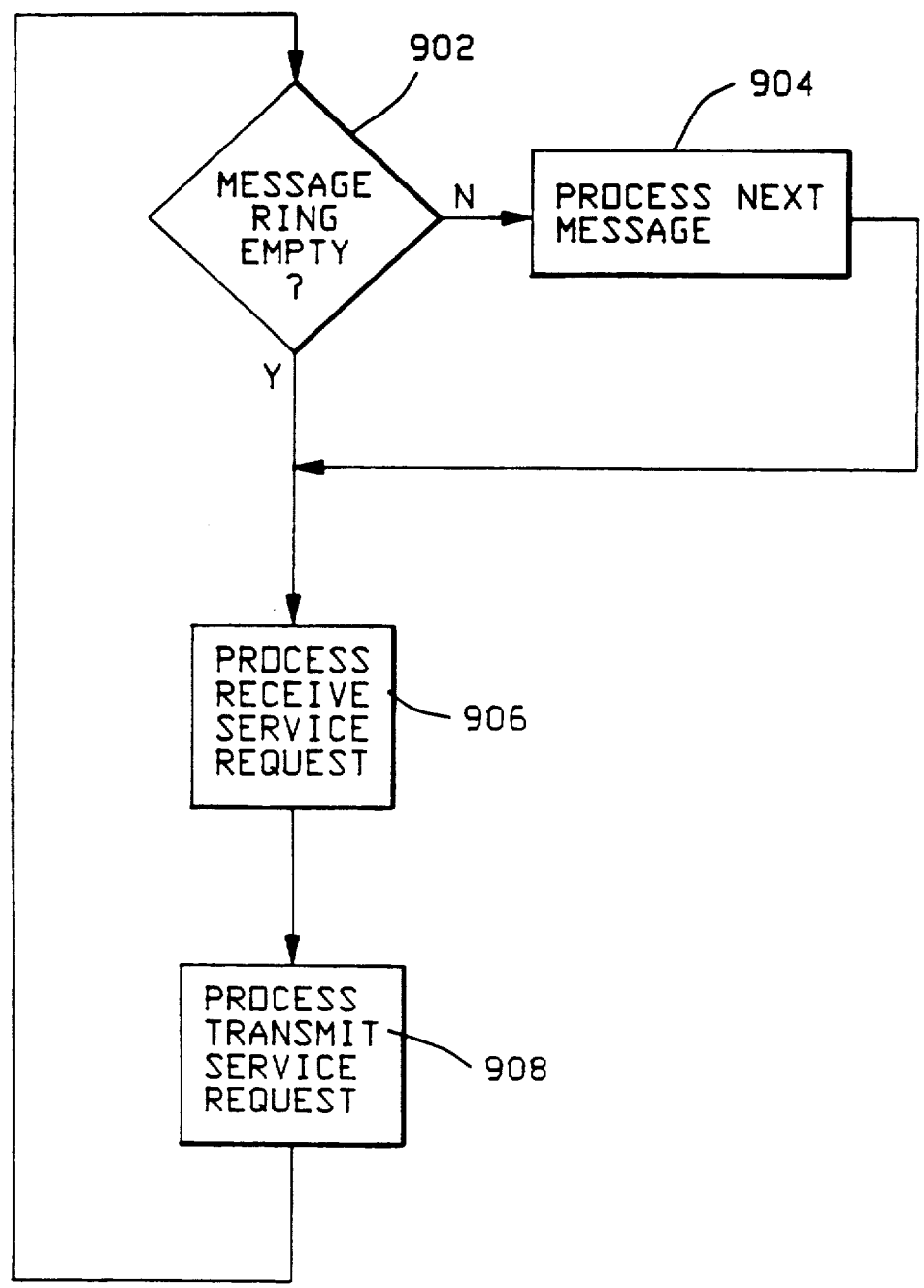
FIGS. 9-11 are flow-chart diagrams which are useful for explaining the operation of the communications processor shown in FIG. 1.
Figure 10:
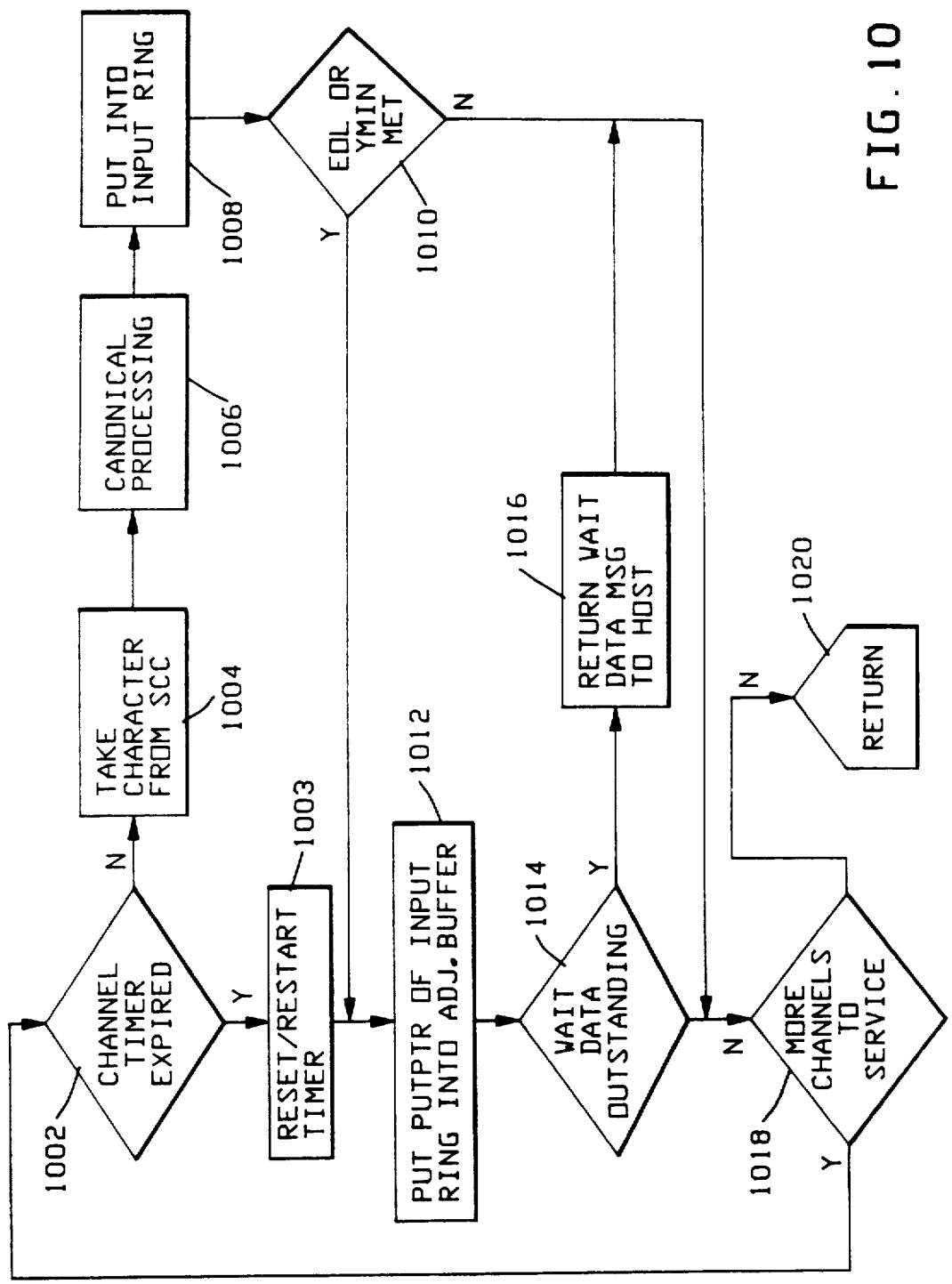
Figure 11:
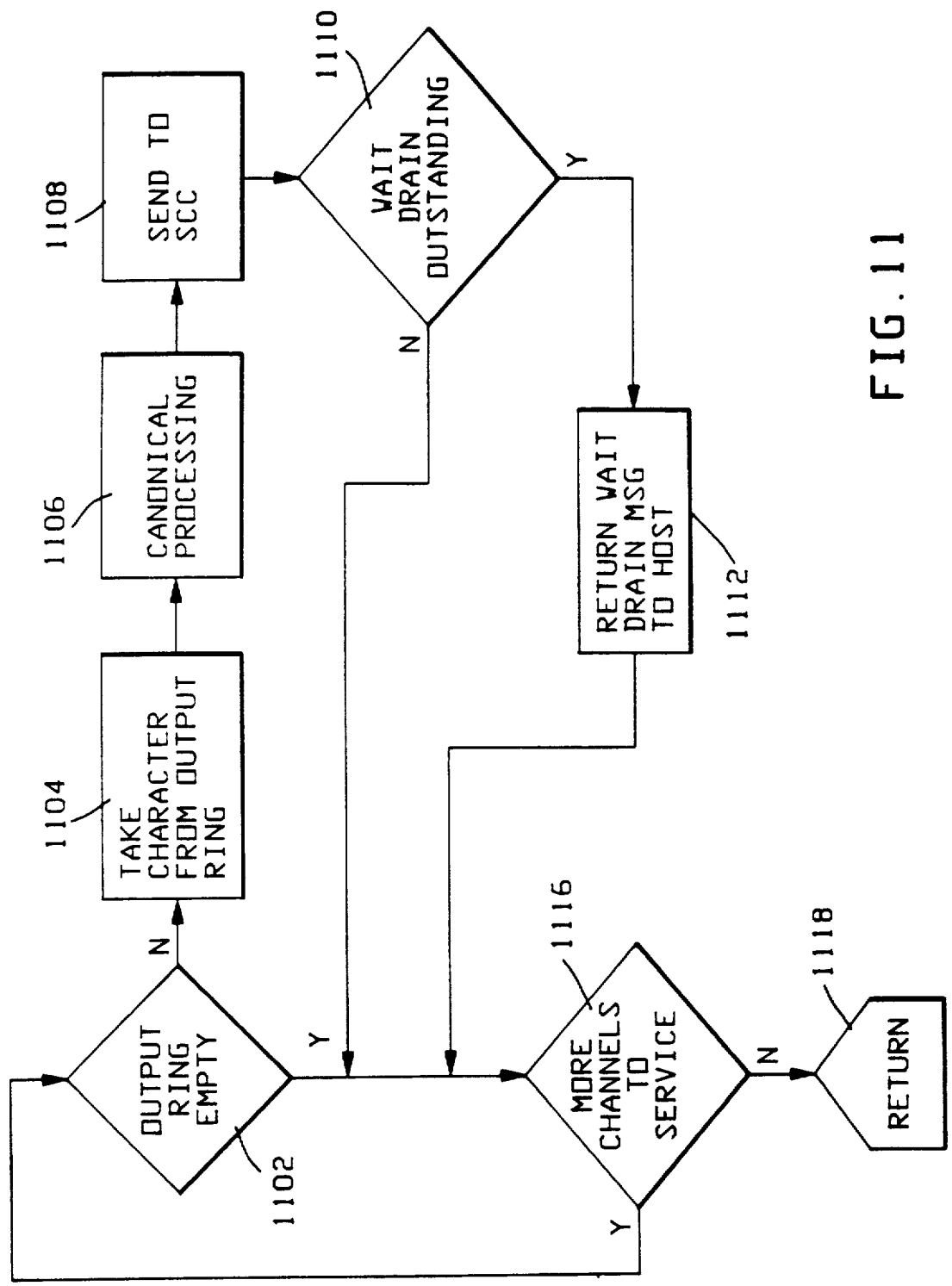

FIGS. 9, 10 and 11 are flow-chart diagrams which illustrate the processing steps performed by the communications processor 124. The program illustrated in FIG. 9 is an endless loop in which the terminal devices are processed when corresponding bits in the transmit service register 154 and receive service register 156 (both shown in FIGS. 1a and 1b) indicate that processing is needed.

As shown in the flow-chart in FIG. 9, the first step, 902, in the loop compares the variables PUTPTR and TAKEPTR for the message ring buffer 182 to determine if the message ring is empty. If the message ring is not empty, then step 904 is executed to retrieve the message addressed by TAKEPTR from the message array 186 and to process that message. They may be, for example, open, close or IOCTL messages for any of the terminal devices 148. The steps performed by the communications processor 124 in processing the open, close and IOCTL messages are described above in reference to FIGS. 3, 8 and 6, respectively.

After the message has been processed, or if the message ring buffer 182 was empty, the communications processor 124, at step 906, examines the receive service register 156 and performs the functions shown in FIG. 10 for each channel represented by a set bit in the register 156.

After all of the receive service requests have been handled, the communications processor 124 executes step 908 to handle the transmit service requests. This step includes examining the transmit service register 154 and performing the steps shown in FIG. 11 for each channel represented by s set bit in the register 154.

After step 908, the communications processor 124 branches back to step 902 to determine if any new messages have been entered into the message ring buffer 182. If at step 906 or step 908, the respective receive service register 156 or transmit service register 154 is found to have no bits set, then control passes directly to the next step in the program. Thus, the receive and transmit service registers 156 and 154 greatly reduce the overhead of the communications processor 124 by allowing it to poll and service only those devices that need to be serviced. In a more typical polling scheme, each terminal device 148 would be polled in each pass through the loop to determine if it needed to be serviced.

FIG. 10 represents the exemplary processing steps for a receive service request. The illustrated steps represent those performed by the canonical processing procedure 130, shown in FIG. 1. These steps describe the handling of a terminal device which corresponds to the TTY protocol. With variations dependent on the type of terminal device used, this flow-chart diagram also represents the steps performed by other communications procedures such as the custom protocol procedures 132.

Receive service processing is only performed for the channels which have their corresponding bits set in the receive service register 156. The first step, 1002, in the exemplary receive service processing procedure is to determine if the channel timer 160 in FIG. 1b has expired. If it has not expired, steps 1004, 1006 and 1008 are executed which take a keystroke from the SCC associated with the channel, apply it to canonical processing algorithms and then put it into the input ring buffer. The canonical processing performed at step 1006 may include, for example, decrementing the value in PUTPTR in response to a backspace character, or resetting PUTPTR to the value held in the top entry of the adjoining buffer 118 in response to a delete line character. If the terminal is being operated in raw mode, the canonical processing algorithms are ignored.

If, after the canonical processing, a character is to be added to the input ring buffer 116, the step 1008 adds the character to the input ring buffer 116 at the slot indicated by the PUTPTR variable of the buffer 116, and increments PUTPTR to address the next slot in the buffer.

After executing step 1008, the communications processor, at step 1010, determines if the character placed in the input ring buffer was an end of line (EOL) character or if, with this character, a preset minimum number of characters (VMIN) are stored in the input ring buffer 116. If neither of these conditions is met, control is transferred to step 1018 which terminates receive service processing for this channel.

If, at step 1002, the channel timer 160 has expired, then it is either reset or restarted at step 1003. The resetting of the timer also resets the bit in the channel receive service register 156. If the channel timer 160 has expired or if, at step 1010, the EOL or VMIN conditions have been met, control transfers to step 1012 where the value held in the variable PUTPTR of the input ring buffer 116 is entered into the adjoining ring buffer 118. Next, at step 1014, the communications processor 124 determines if the terminal protocol state 138 indicates that there is an outstanding wait data message for the channel. If so, the wait data message is returned to the host processor 102 to wake up the waiting process. As set forth above, upon being awakened, the process takes the data in the input ring buffer from the slot pointed to by the variable TAKEPTR up to but not including the slot pointed to by the newly added entry in the adjoining buffer 118. After the wait data message has been returned or, if there was no outstanding wait data message, the processor 124 branches to step 1018.

If other channel bits are set in the receive service register 156, the program branches back, at step 1020 to step 1002 to process each channel having an outstanding receive service request. The branch back to step 1002 may be to the starting point of a different communications procedure depending on the type of device connected to the next channel to be serviced. If no other bits are set in the register 156, step 1022 is executed which terminates receive service request processing.

FIG. 11 is a flow-chart diagram which illustrates exemplary steps that are performed in processing a transmit service request. The steps illustrated correspond to those performed by the canonical processing procedures 130 of FIG. 1. With variations dependent on the type of terminal device used, this flow-chart diagram also represents the steps performed by other communications procedures such as the custom protocol procedures 132. Transmit service processing is only performed for the channels which have their corresponding bits set in the transmit service register 154.

The first step, 1102, in servicing a transmit request is to determine if the output ring buffer 114 for the active device on the channel contains data to be sent to the device. If it does (i.e. if the output ring buffer 114 is not empty), steps 1104, 1106 and 1108 are executed. These steps take a character from the output ring 114, apply it to the canonical processing algorithms and send the canonically processed character to the serial controller 144 for display at the terminal device. The canonical processing performed at step 1106 may include, for example, expanding a tab character to a number of space characters. If the terminal device is being operated in raw mode, the canonical processing algorithms are ignored.

Step 1104 includes the steps of incrementing the TAKEPTR for the output ring buffer 114. After step 1108, the communications processor 124, at step 1110, checks the protocol state 138 to determine if a wait drain message is outstanding for this terminal. If so, step 1112 is executed to determine if a sufficient number of characters have been drained from the output buffer 114. If they have, the processor 124 sends the wait drain message back to the host processor 102. As set forth above, in response to this message, the host processor 102 will add a sequence of characters to the output ring buffer 114.

After step 1112, or after step 1110 if there is no outstanding wait drain message, or after step 1102 if the output ring buffer 114 for the requesting channel is empty, the processor 124 branches to step 1114. At step 1116, the processor branches to step 1102 to process the next channel having a bit set in the transmit service register 154. The branch back to step 1102 may be to the starting point of a different communications procedure depending on the type of device connected to the next channel to be serviced. When all channels corresponding to set bits have been processed, step 1118 is executed which terminates transmit service request processing. The main event poll loop, shown in FIG. 9 then branches from step 908 to step 902 to process any messages that may have arrived while the receive and transmit service requests were being processed.

An exemplary terminal device interface for a UNIX operating system has been described. The device interface divides the functions that are usually performed by the host processor into a set of functions performed by the host processor and a set performed by a dedicated communications processor. A novel message passing facility is used to link the host and communications processors so that messages may be transferred between nonhomogeneous processors without being copied. Terminal device status data is maintained to facilitate the handling of data transfers by the communications processor.

While the invention has been described in terms of an exemplary embodiment, it is contemplated that it may be practiced as outlined above within the spirit and scope of the appended claims.

The invention claimed is:

1. In a computer system configured to be operated under control of an operating system that processes data received from a terminal one character at a time, said computer system including a plurality of terminal input/output (I/O) devices, apparatus for implementing data communications between said plurality of terminal devices and user programs running on said computer system, said apparatus comprising:
storage means which include an input ring buffer data structure;
an adjoining buffer data structure;
communications processor means, coupled to said input ring buffer data structure, said communications processor means including:
means, coupled to said plurality of terminal devices and responsive to service request signals provided thereby, for collecting the character data provided by one of said plurality of terminal devices into said input ring buffer data structure;
means for monitoring the data provided by said one terminal device for a delimiting data value; and
means for entering, into the adjoining buffer data structure, a pointer indicating the location of said delimiting data value in the input ring buffer data structure; and
host processor means including:
means, coupled to said input ring buffer data structure, for examining said input ring buffer data structure and for retrieving said processed data from the input ring buffer data structure one character at a time as said data become available; and
means, coupled to said adjoining buffer data structure and responsive to the pointer held in said adjoining buffer data structure, for retrieving data from the input ring buffer data structure up to and including the delimiting data value.

2. The data communications apparatus set forth in claim 1, further including an output ring data structure, wherein:
said host processor means further includes means, coupled to said output ring data structure for loading data to be sent to said one terminal device into said output ring buffer data structure; and
said communications processor means further includes means, coupled to said output ring data structure and responsive to the service request signals provided by said one terminal device, for transferring data from said output ring data structure to said one terminal device.

3. The data communications apparatus set forth in claim 2 wherein:
said host processor means further includes:
means for generating a wait-data message requesting data from one of said terminal devices; and
means, coupled to said input ring buffer data structure and responsive to a reply message provided by said communications processor means, for accessing the requested data in the input ring buffer data structure; and
said communications processor means further includes means responsive to the wait-data message provided by said host processor for monitoring the data accumulated one character at a time from said one terminal device to generate the reply message for said host processor means.

4. The apparatus of claim 3 wherein said storage means include shared memory means coupled to said host processor means and to said communications processor means for holding said wait-data message and said input ring buffer data structure, wherein said host processor means and said communications processor means access said shared memory means directly.

5. The apparatus of claim 4 wherein:
said host processor means further includes:
means coupled to said shared memory means for generating a wait-drain message indicating that the host processor means is waiting to load an amount of data into said output ring buffer data structure; and
means, coupled to said shared memory means and responsive to a further reply message provided by said communications processor for loading the data into said output ring buffer data structure; and said communications processor includes:

means, coupled to said shared memory means and responsive to said wait-drain message for monitoring the data provided to the one terminal device from the output ring buffer means to determine when sufficient space is available in the output ring buffer means to accommodate the amount of data to be provided by the host processor means; and means coupled to said shared memory means for generating said further reply message to the host processor means when the space in the output ring buffer data structure is available.

6. The apparatus of claim 5 wherein said shared memory means includes:

message storage means for holding said wait-data message, said wait-drain message, said reply message and said further reply message;

input message pointer means coupled to said communications processor means for holding respective pointers to said wait-data and wait-drain messages; and output messages pointer means coupled to said host processor means for holding pointers to said reply and further reply message;

wherein, said communications processor means examines said input message pointer means to access said wait-data and wait-drain messages and said host processor means examines said output message pointer means to access said reply message and said further reply message.

7. The data communications apparatus set forth in claim 1, wherein the data collected by the communications means include a plurality of characters and the communications processor means processes said data to remove extraneous ones of said plurality of characters to produce the characters retrieved by the host processor means.

8. In a computer system operating under the control of an operating system that processes data received from a character-oriented input/output (I/O) device one character at a time, said computer system including a communications processor for implementing data communications between a plurality of said character-oriented I/O devices and user programs running on a host processor, said communications processor coupled to a memory, and wherein each of said plurality of character-oriented I/O devices is coupled to said communications processor and processes commands provided by said communications processor, each one of said I/O devices providing a respective status signal indicating that a data value is ready to be transferred from said one I/O device, apparatus which allows said communications processor to efficiently transfer the respective data values from said plurality of I/O devices to said host processor comprising:

event logic means, coupled to said communications processor and said plurality of character oriented I/O devices and responsive to the commands provided by said communications processor and to the status signals provided by said character-oriented I/O devices, for maintaining a stored value representing the instantaneous status of said plurality of character-oriented I/O devices;

means, within said communications processor and coupled to said event logic means, for periodically examining said stored value and for processing said plurality of character-oriented I/O devices to transfer the respective data values therefrom to said memory only when said stored value indicates that said data values are available to be transferred;

an input ring buffer data structure within said memory, which receives and stores said data values; and host processor means coupled to said memory including means for periodically examining said input ring buffer data structure to retrieve data provided by said plurality of character-oriented I/O devices as said data becomes available.

9. The apparatus set forth in claim 8 further including timer means, coupled to said event logic means and responsive to the commands provided by said processor, for setting a time limit for the processing of one of said commands by one of said plurality of character-oriented I/O devices, wherein said event logic means is coupled to said timer means for indicating when a time limit has elapsed before its associated command has been processed and includes means for storing a further value indicating that said time limit has elapsed before its associated command has been processed; and said means for periodically examining said stored value includes means for examining said further stored value and for processing one of said plurality of character-oriented I/O devices when said further stored value indicates that the time limit for processing a command from said communications processor has elapsed before the command has been processed by the respective one of said plurality of character-oriented I/O devices.

10. In a computer system, including a host processor, a communications processor coupled to at least one terminal input/output (I/O) device and a shared memory accessible by the host and communications processors, said computer system being configured to operate under control of an operating system that processes data received from the terminal I/O device one character at a time, a method of transferring data between said terminal I/O device and said host processor comprising the steps of:

storing data to be sent to said terminal I/O device into an output ring buffer data structure in said shared memory, said storing being under control of said host processor;

periodically examining said shared memory for the presence of data to be transferred from said output ring buffer data structure, said examining being under control of said communications processor; and extracting the data from the output ring buffer data structure and sending the data to said terminal I/O device upon finding said output message structure in the shared memory, said extracting being under control of said communications processor.

11. The method of transferring data set forth in claim 10 further including the steps of:

collecting data provided by said terminal I/O device into an input ring buffer data structure in said shared memory, said collecting being under control of said communications processor;

extracting data requested by a requesting process from said input ring buffer data structure without said host processor processing an interrupt from said communications processor, said extracting being under control of said host processor.

12. In a computer system operating under the control of an operating system that processes data received from a plurality of input/output (I/O) devices one character at a time, said computer system including a communications processor, coupled to a memory, and to first and second (I/O) ones of said plurality of I/O devices each of which processes commands provided by said communications processor, each one of said first and second I/O devices providing a respective status signal indicating that a data value is ready to be transferred from said one I/O device, and further including event logic circuitry, a method of efficiently transferring the respective data values from said first and second I/O devices to said memory comprising the steps of:

monitoring the commands provided by said communications processor and the status signals provided by said first and second I/O devices, using said event logic circuitry;

maintaining within said event logic circuitry a stored value representing the instantaneous status of said first and second I/O devices;

periodically examining said stored value said examining being under control of said communications processor;

processing said first and second I/O devices using said communications processor, to transfer the respective data values therefrom to a ring buffer data structure in said memory only when said stored value indicates that said data values are available to be transferred; and retrieving said data values from said ring buffer data structure by a host processor as said data become available, without processing an interrupt by said host processor by said host processor polling for said data values.

13. The method of efficiently transferring data set forth in claim 12 further comprising the steps of:

indicating in said event logic when a time limit has elapsed before an associated command has been processed by one of said first and second I/O devices;

storing in said event logic a further value indicating that said time limit has elapsed before its associated command has been processed; and periodically examining said further stored value, using said communications processor, to effect processing of one of said first and second I/O devices when said further stored value indicates that the time limit for processing a command from said processor has elapsed while the stored value indicates that the command has not been processed by the respective one of said first and second I/O devices.

14. In a computer system configured to be operated under control of an operating system that processes data received from a terminal one character at a time, said computer system including a plurality of terminal input/output (I/O) devices, apparatus for implementing data communications between one of said terminal devices and a user program running on said computer system, said apparatus comprising:

storage means including an input ring buffer data structure;

communications processor means coupled to said input ring buffer data structure, said communications processor means including means, coupled to said one terminal device and responsive to service request signals provided thereby for collecting data provided one character at a time by said one terminal device into said input ring buffer data structure and for eliminating any extraneous characters from said collected data; and host processor means including means, coupled to said input ring buffer data structure, for transferring data held thereby to said user program, wherein the host processor means polls to determine when the data is to be transferred.

* * * * *